United States Patent Office 3,525,769
Patented Aug. 25, 1970

3,525,769
PRODUCTION OF ACRYLAMIDES
Franz Merger, Ludwigshafen, Germany, assignor to Badische Anilin- & Soda-Fabrik Aktiengesellschaft, Ludwigshafen (Rhine), Germany
No Drawing. Filed Dec. 27, 1968, Ser. No. 787,596
Claims priority, application Germany, Dec. 30, 1967, 1,643,730
Int. Cl. C07c *103/56*
U.S. Cl. 260—561  10 Claims

ABSTRACT OF THE DISCLOSURE

Production of diacrylamide, dimethacrylamide and trimethacrylamide by reaction of urea with acrylyl chloride or methacrylyl chloride in the presence of a base at a temperature less than 40° C. The products are valuable starting materials for the production of synthetic resins, raw materials for surface coatings and intermediates for pesticides.

---

The invention relates to the production of diacrylamide, dimethacrylamide and trimethacrylamide by reaction of urea with acrylyl chloride or methacrylyl chloride.

The methods known for the production of diacrylamide and dimethacrylamide are expensive and give only very low yields. Diacrylamide is obtained according to Journal of the Chemical Society of Japan, Pure Chemistry Section, 64, 359–360 (1961), from acrylamide and acrylic anhydride. Dimethacrylamide cannot be prepared in this manner and is synthesized from methacrylamide, ethyl magnesium bromide and methacrylyl chloride (Journal of Organic Chemistry, USSR, 2, 1212–1214 (1966). A synthesis of trimethacrylamide from methacrylamide and methacrylyl chloride in the presence of pyridine at —20° C. is described in Tetrahedron Letters, London (1965), part 1, pages 23 to 27.

The object of this invention is a new process for the production of acrylamides in good yields and purity in a simple way.

This and other objects are achieved and acrylamides having the general formula:

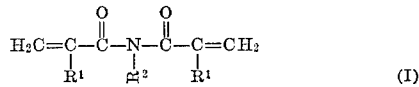

where each $R^1$ denotes a hydrogen atom or a methyl group and $R^2$ denotes a hydrogen atom or (when the radicals $R^1$ denote methyl groups) may also denote the radical:

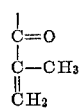

are obtained advantageously by placing urea with acrylyl chloride or methacrylyl chloride in a vessel and then reacting them at a temperature below 40° C. in the presence of a base and an organic solvent which is inert under the reaction conditions.

The reaction, in the case of methacrylyl chloride, may be reproduced by the following equation:

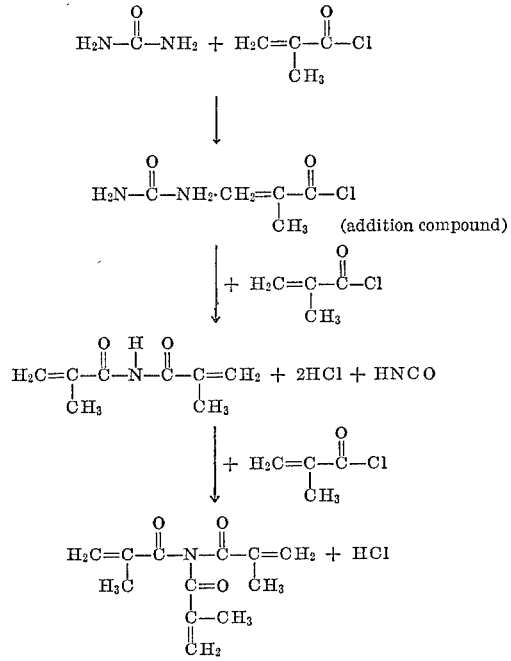

Unlike the prior processes, the process according to this invention surprisingly gives diacrylamide, dimethacrylamide and trimethacrylamide in good yields and purity and is easy to carry out.

The invention starts from the observation that the starting materials urea and acrylyl chloride or methacrylyl chloride form 1:1 adducts (not hitherto described) which under the conditions of the process react with more acrylyl chloride or methacrylyl chloride at a temperature below 40° C. and in the presence of bases to form diacrylamide, dimethacrylamide and/or trimethacrylamide. At temperatures above 40° C. and in the presence of bases, the adducts are converted into acrylic or methacrylic ureides. Acrylyl chloride as a rule is used in an amount of 1 to 2 moles for each mole of urea. Under the process conditions according to the invention however diacrylamide is obtained even with other molar ratios, for example at a molar ratio of urea to acrylyl chloride of from 1:0.1 to 1:5.

When urea is reacted with methacrylyl chloride, mixtures of dimethacrylamide and trimethacrylamide are generally formed. These two starting materials can be reacted in any molar ratio, mainly dimethacrylamide being formed at a molar ratio of 1 mole of urea to 1.4 moles or less than 1.4 moles of methacrylyl chloride. At a molar ratio of 1 mole of urea to 1.8 and more than 1.8 moles of methacrylyl chloride, mainly trimethacrylamide is formed. In the production of dimethacrylamide it is therefore preferable to use a molar ratio of urea: methacrylyl chloride of from 1:0.05 to 1:1.4, particularly from 1:0.5 to 1:1.2; in the production of trimethacrylamide it is preferable to use a molar ratio of 1:1.8 to 1:5, particularly from 1:2 to 1:4.

The adduct may also be first isolated and then the reaction carried out with the isolated compound as starting material, with or without the addition of further acrylyl or methacrylyl chloride.

The bases used in the process bind the hydrogen chloride formed and accelerate the reaction. Organic or inorganic bases having a basicity constant $K_B$ of more than $10^{-10}$ are generally used in an amount of from 100 to 200 mole percent with reference to the acrylyl or methacrylyl chloride. Thus for example the following bases may be used: tertiary amines, e.g., triethylamine, diisopropylmethylamine, pyridine, alkali metal or alkaline earth metal hydroxides, alcoholates or carbonates, for example sodium, potassium, barium, strontium or calcium hydroxide, sodium carbonate and sodium methylate.

The reaction may be carried out at a temperature of less than 40° C., preferably from 10° to 30° C., at atmospheric or superatmospheric pressure, continuously or batchwise. Organic solvents which are inert under the reaction conditions, such as cyclic ethers, for example dioxane and tetrahydrofuran; chlorohydrocarbons, for example chloroform and methylene chloride; carboxylic esters, for example methyl acetate; and nitriles, for example acetonitrile. Amides, for example dimethylformamide, cannot be used as solvents. The solvent is generally used in an amount of from 100 to 1000%, preferably from 250 to 750%, by weight with reference to urea.

The reaction may be carried out as follows: acrylyl chloride or methacrylyl chloride is added to a mixture of urea and solvent during from five minutes to two hours. At the said reaction temperature, an adduct forms, the mixture being cooled if necessary. The adduct may then be separated by filtration, solvent again added, further acrylyl chloride or methacrylyl chloride added if necessary, and the product converted into diacrylamide, dimethacrylamide or trimethacrylamide by adding a base. It may be advantageous however not to separate the adduct but to add the base to the reaction mixture with good mixing and if necessary cooling. The mixture is kept at the reaction temperature for from one to five hours, filtered and the end product isolated by concentration of the filtrate. The end product is obtained in pure form by recrystallization from water or ethanol.

In the case of mixtures of dimethacrylamide and trimethacrylamide, the two components may be separated in the usual way, for example by fractional crystallization of the sparingly soluble trimethacrylamide from ethanol.

When diacrylamide is gradually heated it polymerizes into a solid product, but melts to a colorless liquid upon rapid introduction into a temperature zone of 180° C. Dimethacrylamide and trimethacrylamide are compounds capable of being distilled in vacuo and having the melting point 105° and 103° C.

Compounds which can be prepared by the process according to this invention are valuable starting materials for the production of synthetic resins, raw materials for surface coatings and intermediates for pesticides.

The invention is illustrated by the following examples.

EXAMPLE 1

270 parts of acrylyl chloride is added to a suspension of 180 parts of urea in 700 parts of dioxane in the course of thirty minutes; the temperature is kept at from 25° to 35° C. After the evolution of heat has ceased, the reaction mixture is cooled to 20° C., 350 parts of triethylamine is added while stirring vigorously in the temperature range of from 20° to 26° C., and the mixture is stirred for another two hours, filtered, the filtrate concentrate and the precipitate is recrystallized from water. 61 parts (32.8% of the theory) of diacrylamide is obtained as colorless prisms which polymerize before reaching the melting temperature when they are heated.

Molecular weight: 125 (mass spectrometric).

Analysis.—Calculated (percent): C, 57.6; H, 5.6; O, 25.6; N, 11.2. Found (percent): C, 57.5; H, 5.7; O, 25.5; N, 10.9.

EXAMPLE 2

A reaction mixture prepared as in Example 1 from 180 parts of urea and 270 parts of acrylyl chloride in 700 parts of dioxane has 300 parts of finely powdered anhydrous sodium carbonate added to it and the temperature is kept at from 20° to 25° C. while stirring vigorously. The mixture is filtered, the filtrate is concentrated and the residue obtained is recrystallized from water. 39 parts of diacrylamide is obtained, i.e., 20.8% of the theory.

EXAMPLE 3

200 parts of methacrylyl chloride is added in the course of thirty minutes while stirring to a suspension of 180 parts of urea in 750 parts of dioxane; the temperature is kept at from 25° to 35° C. by cooling with ice. After the evolution of heat has ceased, the reaction mixture is cooled to 20° C., 250 parts of triethylamine is added with vigorous stirring at from 24° to 28° C. and the whole is stirred for another two hours, filtered, the filtrate is concentrated and the precipitate is recrystallized from ethanol. 64.8 parts of dimethacrylamide is obtained (44% of the theory with reference to methacrylyl chloride). The melting point is 104° to 105° C.

Analysis.—Calculated (percent): C, 62.72; H, 7.23; N, 9.16; O, 20.89. Found (percent): C, 62.5; H, 7.3; N, 9.4; O, 21.1.

EXAMPLE 4

To a suspension of 60 parts of urea in 500 parts of dioxane, 208 parts of methacrylyl chloride is added in the course of twenty minutes while stirring. The temperature is kept at from 25° to 30° C. by cooling with ice. After evolution of heat has ceased, the reaction mixture is cooled to 20° C., 250 parts of triethylamine is added with vigorous stirring at from 20° to 30° C. and the whole is stirred for another two hours, filtered, the solvent evaporated in vacuo, the residue boiled for a short time with water and recrystallized from ethanol. 59.8 parts of trimethacrylamide (40.5% of the theory with reference to methacrylyl chloride) is obtained. The melting point is 103° to 104° C.

Analysis.—Calculated (percent): C, 65.05; H, 6.82; N, 6.32; O, 21.66. Found (percent): C, 64.9; H, 7.6; N, 6.8; O, 21.4.

EXAMPLE 5

350 parts of methacrylyl chloride is added in the course of thirty minutes to a suspension of 60 parts of urea in 500 parts of dioxane. The temperature is kept at from 25° to 30° C. After evolution of heat has ceased, the reaction mixture is cooled to 20° C., 400 parts of triethylamine is added with vigorous stirring at from 20° to 28° C. and the whole is stirred for another two hours, filtered, the filtrate is concentrated, the product is precipitated with a mixture of benzene and petroleum ether and recrystallized from ethanol. 111 parts of trimethacrylamide (44.81% of the theory with reference to methacrylyl chloride) is obtained.

I claim:

1. A process for the production of acrylamide having the general formula:

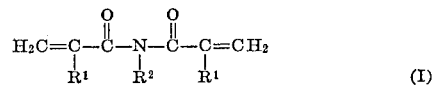

(I)

where each $R^1$ denotes a hydrogen atom or a methyl group and $R^2$ denotes a hydrogen atom or (when $R^1$ denotes a methyl group) $R^2$ may denote the radical

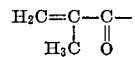

wherein urea is placed in a vessel with acrylyl or methacrylyl chloride and then reacted in the presence of a base and a solvent which is inert under the reaction conditions at a temperature of less than 40° C.

2. A process as claimed in claim 1 carried out with acrylyl chloride in an amount of 1 to 2 moles with reference to 1 mole to urea.

3. A process as claimed in claim 1 carried out with a molar ratio of urea to methacrylyl chloride of from 1:0.05 to 1:1.4.

4. A process as claimed in claim 1 carried out with a molar ratio of urea to methacrylyl chloride of from 1:0.5 to 1:1.2.

5. A process as claimed in claim 1 carried out with a molar ratio of urea to methacrylyl chloride of from 1:1.8 to 1:5.

6. A process as claimed in claim 1 carried out with a molar ratio of urea to methacrylyl chloride of from 1:2 to 1:4.

7. A process as claimed in claim 1 carried out in the presence of a base in an amount of from 100 to 200 mole percent with reference to the acid chloride.

8. A process as claimed in claim 1 carried out at a temperature of from 10° to 30° C.

9. A process as claimed in claim 1 carried out in the presence of a solvent which is inserted under the reaction conditions and in an amount of from 100 to 1000% by weight with reference to urea.

10. A process as claimed in claim 1 carried out in the presence of an organic solvent which is inert under the reaction conditions in an amount of from 250 to 750% by weight with reference to urea.

References Cited

UNITED STATES PATENTS 3,130,229  4/1964  Friedrich et al. _____ 260—561

NICHOLAS S. RIZZO, Primary Examiner

R. V. RUSH, Assistant Examiner